July 18, 1972  C. W. KING  3,677,769
MULTITEXTURED AND PATTERNED DOUGHS

Filed May 28, 1970  2 Sheets-Sheet 1

INVENTOR.
CHARLES W. KING
BY
Gene O. Enochson
ATTORNEY

July 18, 1972  C. W. KING  3,677,769

MULTITEXTURED AND PATTERNED DOUGHS

Filed May 28, 1970  2 Sheets-Sheet 2

INVENTOR
CHARLES W. KING
BY Gene O. Enockson
ATTORNEY 3,677,769
MULTITEXTURED AND PATTERNED DOUGHS
Charles W. King, Minneapolis, Minn., assignor to
General Mills, Inc.
Filed May 28, 1970, Ser. No. 41,339
Int. Cl. A21d 8/02
U.S. Cl. 99—86          5 Claims

ABSTRACT OF THE DISCLOSURE

A process for registering patterns on yeast leavened dough. In selected areas of the dough, the yeast is inactivated by heat thus impairing rising and forming depressed areas in the final baked product.

---

This invention relates to a process for imprinting patterns on yeast leavened baked products and the products made by this process. In particular, it relates to registering shape and texture patterns on yeast leavened baked products by applying heat and pressure to selected areas of the fermented dough.

The process of this invention can be used to imprint patterns on sheeted bread doughs and bread-like doughs. It is particularly useful in producing snack type items, partitioned pizza crusts and cupped products from sheeted doughs. One aspect of this invention is that distinctly crisp textured areas in a baked product can be coupled with areas having bread-like texture. Another aspect is that protruding areas can be coupled and contiguous with preshaped depressed areas in a baked product.

Figure 1:
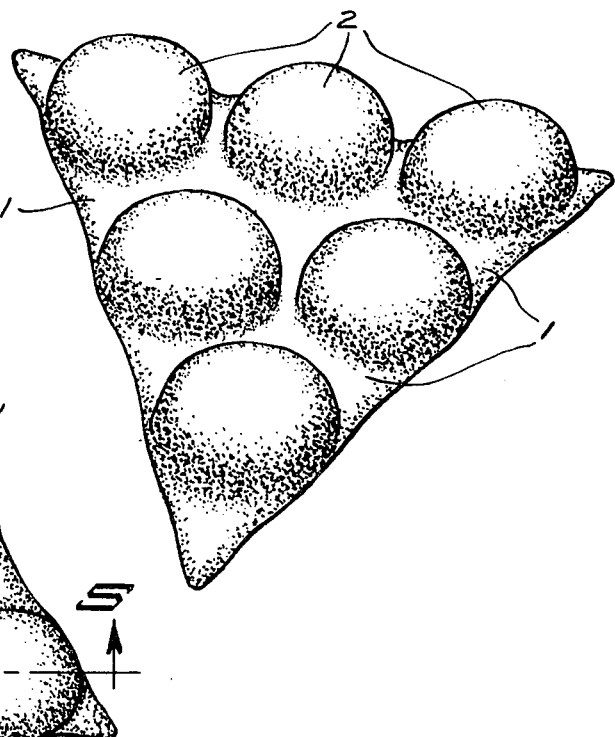
FIG. 1 shows a perspective view of a typical snack item with depressed crisp areas 1 and protruding bread-like areas 2.

According to the present invention, the procedure for registering patterns on yeast leavened baked products comprises the following steps:

(1) A dough having a yeast component is allowed to ferment and leaven.

(2) The fermented and leavened dough is then sheeted to receive the pattern.

(3) The fermented and leavened, sheeted dough is brought into contact with a heating member which is pressed into selected areas of the dough forming indentations in the dough while simultaneously transmitting heat to the indented areas of the dough thus inactivating the yeast in these areas.

(4) The dough and the heating member are then disengaged.

(5) The imprinted dough is optionally baked or frozen.

An additional fermentation period can be included, if desired, after the dough has been imprinted and prior to baking or freezing.

The doughs used in the practice of this invention are yeast leavened. Formulating yeast leavened dough is well known in the baking art and is not part of the present invention. It is well established that for fermentation and leavening to take place flour, water, yeast, and some nutritive material to sustain yeast activity are necessary. The nutritive matter can be saccharides within the flour. More frequently it is some saccharide added to the dough such as sucrose, malt syrup, maltodextrins, corn syrups or the like. A wide variety of flours and yeasts are commercially available for use in yeast leavened doughs. The commercially available yeasts are usually in either dry form or compressed form. When using compressed yeast, it is common practice in mixing the dough to adjust the temperature of the water added to the flour so that the temperature of the dough at the end of the mixing period is about 80° F. When using dry yeast, it is common practice to hydrate the yeast in water having a temperature of about 115° F. for purposes of activating the yeast. The temperature of the balance of the water added to the dough ingredients is generally so adjusted that the temperature of the dough at the end of the mixing period is about 80° F. Often the composition of the dough is from about 55% to 65% flour by weight of the composition, about 1% to 3.3% saccharide fraction by weight of the composition, about 0.5% to 3.3% yeast by weight of the composition and about 31% to 57% water by weight of the composition. These procedures and proportions are frequently used for making leavened bread-type products and are not part of the present invention.

The heating member comprises a heat conducting grill or framework constructed of a solid material, preferably strainless steel, shaped to correspond to the areas to be depressed in the dough. Open spaces around the framework correspond to the areas of the dough which are not to be depressed. Generally the heating member is in the form of an open grill or branding iron and, if desired, so designed that dough can move up through the design work. The heating member, however, can be so designed as to make only a single indentation. In order to form a pattern the surface area of the sheeted dough contacted by the heating member must be less than the total surface area of the sheeted dough in its final shape after cutting. To avoid sticking to the dough, the heating member can be covered with non-sticking coating materials such as Teflon or Mylar or release agents such as silicon base release agents or cooking oil. The heating member is preferably maintained at a temperature of about 180° F. to 240° F. The heat transmitted from the heating member to the dough inactivates the yeast at and for a short distance below the surface of the dough contacted by the heating member. This inhibits further leavening action of the dough in these particular areas. The heat transfer between the heating member and the dough which may be forced through the grill work is not such that the yeast activity is substantially effected. When the heating member is pressed into the dough, the dough immediately below the heating member is compacted thus creating a more compressed texture in this area than is found in areas not depressed by the heating member. The pressure applied to the heating member is determined by the thickness of the dough and the depth of indentation desired.

The invention is readily applied to patterning sheeted doughs. The thickness of any particular dough using any particular pattern impressing device and depth of indentation is limited only by the necessity of not leaving so much yeast active dough under and around the imprinted pattern that the pattern is lost due to dough expansion caused by the fermenting and leavening of the dough under and around the pattern. Patterns can be easily impressed on sheeted doughs having a thickness of from about ³⁄₃₂ to ¾ inch to form snack items, pizza crusts and like products. In snack items in which both crisp and relatively soft areas are desired, good results are obtained when a dough is fermented at a temperature of about 80° F. for a period of one half to one and one half hours, punched down and allowed to ferment and leaven further for a period of about 10 to 20 minutes, then sheeted to a thickness of from about 3/32 to 5/16 inch and allowed to ferment and leaven still further for a period of about 10 to 40 minutes. At this point the dough is moved into contact with the heating member. The heating member is pressed into the dough thereby compressing portions of the dough. The heating member can be forced down into the sheeted dough to a depth of from about one-fourth to three-fourths the thickness of the dough. The dough not compressed by the heating member is gently forced up through the open design in the heating member. Heat from the heating member does not significantly inhibit the yeast activity in the protruding portions of the dough and the texture in the protruding portions remains cellular and bread-like. Once the pattern has been imprinted on the dough, the heating member is removed. Before baking, the dough is cut to predetermined sizes such as finger size desirable for some snacks, circular discs, squares or other shapes. Depending upon the specific product desired, the dough may be allowed to ferment and leaven further after the imprinting of the pattern before being baked and frozen or frozen and baked later or baked and not frozen. Good results have been obtained when the dough has been baked for a period of about 5 to 7 minutes in an oven at a temperature of about 400° to 475° F. The dough in areas where the yeast is still active continues to ferment and leaven during the early stages of baking forming raised bread-like areas and further accentuates the design. The dense, yeast inactivated areas become crisp. In order to achieve shelf stability the snack item should have a moisture content below about 8% by weight of the composition. Some drying occurs during baking. A drying step can, however, be employed after baking if desired.

When making partitioned pizza crusts, the dough is allowed to ferment as described above and is then sheeted to a thickness of from about 1/4 to about 3/4 inch. A heating member, having open elongated areas which allow the dough to push through the heating member and form ridges in the dough, is pressed into the dough to a depth of from about 1/4 to about 3/4 the thickness of the dough. The impression can be sufficiently shallow that there is still a portion of dough under the heating member in which the yeast remains active. On the other hand, the impression can be sufficiently deep as to inactivate all of the yeast under the heating member. The preferred procedure is determined by the particular crust texture desired. As the dough is being imprinted with ridges, it can simultaneously or sequentially be cut into the desired predetermined shape for the final pizza crust such as into a circular or rectangular form. Different pizza sauces can be placed in the depressed areas of the crust added either before baking or after baking. The ridges prevent the different sauces from flowing together. The product can be frozen and baked, partially baked and frozen, completely baked and frozen or baked without any freezing. Baking is usually conducted at oven temperatures of about 400° F. to 475° F. Freezing of the product at some point in its manufacture is a conventional practice and does not constitute part of the present invention.

A further improvement in pizza crusts can be achieved by using two heating members. The first heating member is as described above. The second heating member comprises a series of heated needles or pegs. The pattern of needles or pegs on the second heating member corresponds to the pattern of the open elongated areas of the first heating member. The second heating member is so positioned against the surface of the dough opposite the first heating member that the needles or pegs extend up into the dough protruding through the elongated open spaces of the first heating member. The heated needles or pegs perforate the dough along the protruding areas and inactivate the yeast at the surfaces of the perforations. The pizza crust is then baked. When finally reheated and used by the consumer, the pizza crust will tear apart without cutting along the ridges formed by the first heating member because of the perforations formed by the second heating member along the underside of the ridges.

Specific embodiments of the present invention are set out below to further illustrate the process. It can be readily appreciated that the invention has many applications in making yeast leavened baked products having different shapes and uses.

EXAMPLE I

This example illustrates impressing a pattern on a sheeted dough to produce a snack item having both compressed, crisp areas and raised bread-like areas.

A yeast dough composed of the following ingredients was made:

| Ingredients: | Percentage by wt. |
|---|---|
| Bread wheat flour | 58.80 |
| Compressed yeast | 1.15 |
| Sugar | 1.80 |
| Salt | 1.15 |
| Water | 37.10 |
| | 100.00 |

The dough was allowed to ferment for a period of 45 minutes. Following this fermentation period, the dough was sheeted to a 1/4 inch thickness and allowed to ferment further for a period of 15 minutes. After the second fermentation period, the dough was run through a Teflon roll having a raised open grill pattern on its surface. The grill pattern was maintained at a temperature of 220° F. The dough was allowed to ferment further for a period of about 45 minutes. It was then continuously run through a baking oven having a temperature of about 450° F.

The product produced has thin, crisp depressed areas wherever it had been touched by the heated grill and bread-like areas in the portions which had not been touched by the grill. The product is shown in FIGS. 1 to 5.

EXAMPLE II

This example illustrates impressing a pattern on a sheeted dough to produce a snack item having both compressed, crisp areas and raised bread-like areas in which only fermentation and leavening during baking was used after imprinting the pattern.

A yeast dough composed of the following ingredients was made:

| Ingredients: | Percentage by wt. |
|---|---|
| Bread wheat flour | 57.0 |
| Water and ice | 32.0 |
| Compressed yeast | 1.7 |
| Malt syrup (non-diastatic) | .6 |
| Baker's salt | 1.0 |
| Dough improvers * | 1.0 |
| Vegetable shortening (Kopold, manufactured by Kumko Inc.) | 5.7 |

*The dough improver used was Redi-Sponge manufactured by the Foremost Dairies composed of whey solids, corn flour, monocalcium phosphate, 1-cystein and potassium bromate.

The dough was fermented for a period of one half hour at a temperature of about 80° F., punched and lightly kneaded and allowed to ferment another 15 minutes. The dough was sheeted to a thickness of 5/16 inch. After sheeting, the dough was allowed to ferment and leaven for another 15 minutes. The same pattern as was used in Example I was imprinted on the dough by pressing a heating member having a temperature of about 180° F. into the dough to a depth of about two thirds the thickness of the dough. Following imprinting, the dough was cut into finger food size. Poppy seeds were spread in the depressions in the dough and the dough pieces were baked for seven minutes at a temperature of 400° F.

Figure 2:
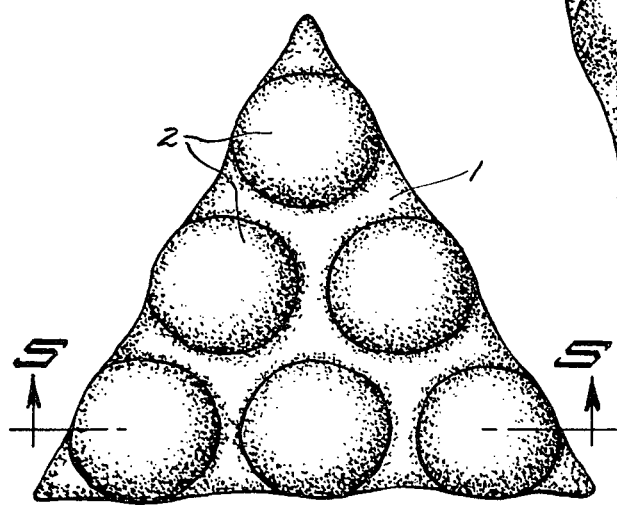
FIG. 2 shows a plan view of the product shown in FIG. 1.
Figure 3:
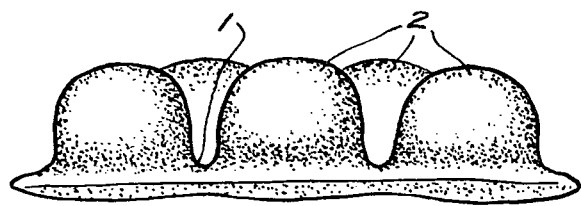
FIG. 3 shows a side view of the product shown in FIG. 1.
Figure 4:
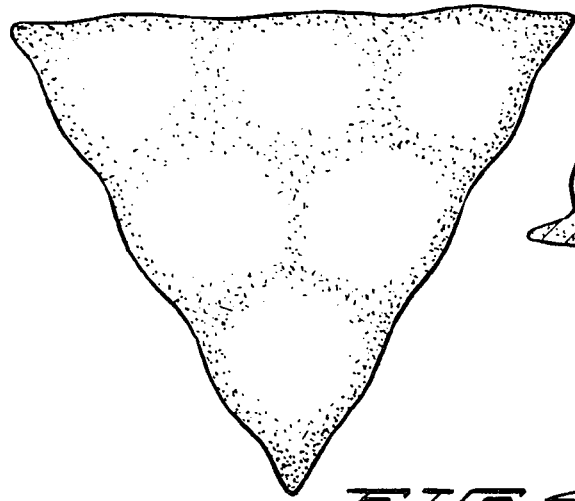
FIG. 4 shows a bottom view of the product shown in FIG. 1.
Figure 5:
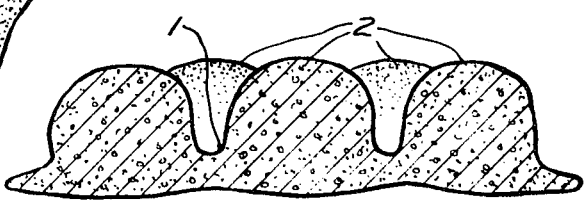
FIG. 5 shows a cross sectional view of the product shown in FIG. 1.
Figure 6:
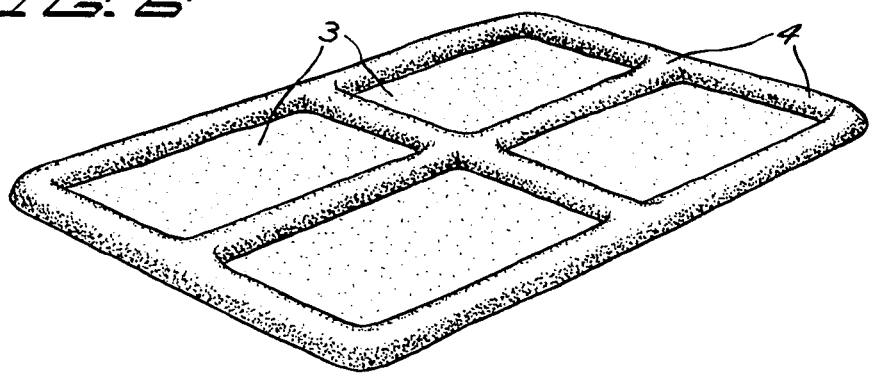
FIG. 6 shows a perspective view of a rectangular pizza crust with depressed areas 3 and protruding ridges 4.
Figure 7:
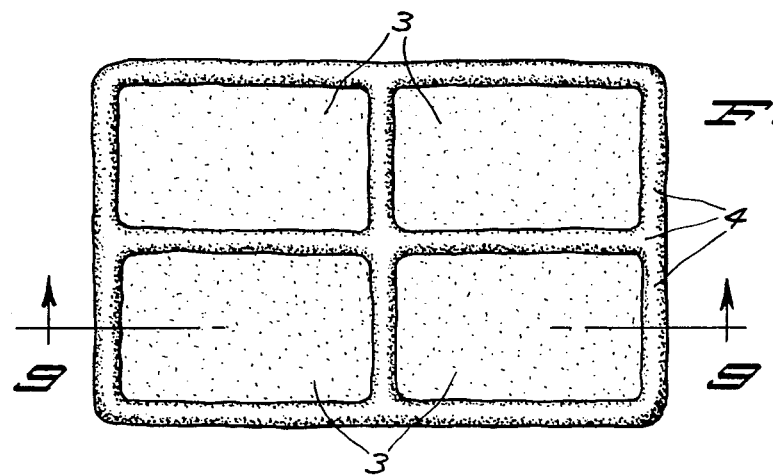
FIG. 7 shows a top view of the product shown in FIG. 6.
Figure 8:
FIG. 8 shows a side view of the product shown in FIG. 6.
Figure 9:
FIG. 9 shows a cross sectional view of the product shown in FIG. 6.

The finished product had depressed crisp areas containing poppy seeds and raised bread-like areas. The product is shown in FIGS. 1 and 2.

EXAMPLE III

This example illustrates the use of the present process for making pizza crust having raised areas, namely ridges, partitioning the surface of the crust into sections.

A dough was fermented and sheeted as in Example II. The dough was then cut into rectangular shapes about 8 inches long and 5 inches wide. A heating member having a heating surface about 3½ inches long and 2 inches wide was used to make four imprints on the sheeted, cut dough. Between the imprints and around the edges of the dough elongated areas or ridges were left containing active yeast. The temperature of the heating member was 200° F. After imprinting, the dough was docked and a commercially canned pizza sauce was poured into the imprinted areas. The unbaked pizza was then put into an oven having a temperature of about 425° F. and baked for a period of about five minutes.

The baked pizza crust had distinct raised areas or ridges separating the areas containing the sauce and a raised rim around the edges. The crust was crisp and tender in the imprinted areas and tender and bread-like in the raised areas. The pizza crust is shown in FIGS. 6 to 9.

The embodiments of the invention in which an exclusive property or privilege is claimed are defined as follows:

1. A process for registering shape and texture patterns on yeast leavened dough which comprises:
    fermenting and leavening a dough that contains yeast;
    sheeting the fermented and leavened dough to a thickness of from about 3/32 to ¾ inch;
    bringing the fermented and leavened sheeted dough into contact with a heating member;
    pressing said heating member into selected areas of the fermented and leavened sheeted dough to a depth of from about one-fourth to three-fourths the thickness of the fermented and leavened sheeted dough and simultaneously transmitting heat through said heating member to said selected areas thereby inactivating at least part of the yeast in the selected areas without significantly inhibiting the yeast in the remaining portions of the fermented, leavened sheeted dough whereby the rising of only the selected areas is impaired during subsequent baking of the dough to produce a final baked product having depressed areas therein; and
    disengaging the fermented and leavened sheeted dough from contact with the heating member.

2. The process of claim 1 wherein said heating member is at a temperature of about 180° F. to 240° F.

3. The process of claim 1 wherein the dough is baked following the disengaging of the fermented and leavened, sheeted dough from contact with the heating member.

4. The process of claim 3 wherein the process includes a fermentation and leavening step subsequent to contacting the fermented, sheeted dough with the heating member and prior to baking the fermented, sheeted dough.

5. The process of claim 3 which includes cutting the fermented and leavened, sheeted dough into predetermined shapes prior to baking.

References Cited
UNITED STATES PATENTS

| | | | |
|---|---|---|---|
| 1,044,179 | 11/1912 | Horner | 99—90 R |
| 2,774,316 | 12/1956 | Daino | 99—86 UX |

RAYMOND N. JONES, Primary Examiner

J. R. HOFFMAN, Assistant Examiner

U.S. Cl. X.R.

99—90 S